US011913270B2

(12) United States Patent
Goetz

(10) Patent No.: US 11,913,270 B2
(45) Date of Patent: Feb. 27, 2024

(54) GUIDE SYSTEM FOR GUIDING A MOVABLY MOUNTED DOOR LEAF

(71) Applicant: Julius Blum GmbH, Hoechst (AT)

(72) Inventor: Christof Goetz, Lustenau (AT)

(73) Assignee: JULIUS BLUM GMBH, Hoechst (AT)

( * ) Notice: Subject to any disclaimer, the term of this patent is extended or adjusted under 35 U.S.C. 154(b) by 449 days.

(21) Appl. No.: 17/240,361

(22) Filed: Apr. 26, 2021

(65) Prior Publication Data

US 2021/0246699 A1 Aug. 12, 2021

Related U.S. Application Data

(63) Continuation of application No. PCT/AT2019/060387, filed on Nov. 13, 2019.

(30) Foreign Application Priority Data

Nov. 14, 2018 (AT) .............................. A 50999/2018

(51) Int. Cl.
*E05D 15/58* (2006.01)
*E06B 3/50* (2006.01)

(52) U.S. Cl.
CPC ............ *E05D 15/58* (2013.01); *E06B 3/5045* (2013.01); *E05D 2015/586* (2013.01); *E05Y 2900/208* (2013.01)

(58) Field of Classification Search
CPC . E05D 15/58; E05D 15/264; E05D 2015/586; E06B 3/5045; E06B 3/482;
(Continued)

(56) References Cited

U.S. PATENT DOCUMENTS

| | | | |
|---|---|---|---|
| 5,131,449 A | | 7/1992 | Winn et al. |
| 8,336,972 B2 | | 12/2012 | Haab et al. |

(Continued)

FOREIGN PATENT DOCUMENTS

| | | | |
|---|---|---|---|
| AT | 519246 | | 5/2018 |
| AT | 519247 | * | 5/2018 |

(Continued)

OTHER PUBLICATIONS

International Search Report dated Jan. 30, 2020 in International (PCT) Application No. PCT/AT2019/060387.

(Continued)

*Primary Examiner* — Janet M Wilkens

(74) *Attorney, Agent, or Firm* — Wenderoth, Lind & Ponack, L.L.P.

(57) ABSTRACT

A guide system includes a guide rail for guiding a door wing, a running carriage to be connected to the door wing and displaceably supported along the guide rail, and a carrier on which the running carriage can be arranged. The carrier is movably supported in a direction transverse to the longitudinal direction of the guide rail. The carrier can be moved into a transfer position in which the carrier adjoins the guide rail in the longitudinal direction. A locking device can releasably lock the carrier in the transfer position to restrain a movement in the transverse direction. The locking device includes a movably-supported locking element for releasably locking between the guide rail and the carrier, and a control contour curved so that the running carriage can be moved over a region in the transverse direction. The movably-supported locking element includes a supporting element displaceable along the control contour.

23 Claims, 14 Drawing Sheets

(58) Field of Classification Search
CPC ......... E05Y 2900/208; E05Y 2900/212; E05Y 2201/218; E05Y 2201/22; E05Y 2201/638; E05Y 2201/684; E05Y 2201/688
USPC .................................................. 312/322, 325
See application file for complete search history.

(56) References Cited

U.S. PATENT DOCUMENTS

| | | | | |
|---|---|---|---|---|
| 8,522,398 | B2 | 9/2013 | Haab et al. | |
| 9,068,386 | B2 | 6/2015 | Ishii et al. | |
| 10,400,493 | B2 | 9/2019 | Gabl | |
| 11,008,791 | B2 | 5/2021 | Rupp et al. | |
| 2010/0117500 | A1* | 5/2010 | Giorgi | E05D 15/264 312/319.1 |
| 2010/0269291 | A1 | 10/2010 | Haab et al. | |
| 2010/0270898 | A1 | 10/2010 | Haab et al. | |
| 2014/0150208 | A1* | 6/2014 | Haab | E05D 13/00 16/86.2 |
| 2015/0008811 | A1 | 1/2015 | Ishii et al. | |
| 2017/0260789 | A1 | 9/2017 | Gabl | |
| 2019/0284859 | A1 | 9/2019 | Rupp et al. | |
| 2019/0301218 | A1 | 10/2019 | Rupp et al. | |
| 2020/0018108 | A1 | 1/2020 | Sperger et al. | |
| 2021/0246700 | A1* | 8/2021 | Hoffmann | E05D 15/581 |

FOREIGN PATENT DOCUMENTS

| | | | |
|---|---|---|---|
| AT | 519374 | | 6/2018 |
| AT | 519514 | * | 7/2018 |
| AT | 519902 | | 11/2018 |
| AT | 521133 | * | 11/2019 |
| CN | 104832021 | | 8/2015 |
| CN | 107542350 | | 1/2018 |
| DE | 43 08 196 | | 10/1993 |
| EP | 0 433 726 | | 6/1991 |
| EP | 274870 | * | 6/2014 |
| EP | 3 622 154 | | 3/2020 |
| JP | 2018-500483 | | 1/2018 |
| KR | 10-2018-0006703 | | 1/2018 |
| TW | 201102486 | | 1/2011 |
| WO | 2013/114730 | | 8/2013 |
| WO | 2016/081963 | | 6/2016 |
| WO | 2018/129572 | | 7/2018 |
| WO | 2018/129573 | | 7/2018 |
| WO | 2018/204947 | | 11/2018 |
| WO | 2019012435 | * | 1/2019 |

OTHER PUBLICATIONS

Search Report dated Mar. 16, 2022 in Chinese Patent Application No. 201980074740.0.

* cited by examiner

GUIDE SYSTEM FOR GUIDING A MOVABLY MOUNTED DOOR LEAF

BACKGROUND OF THE INVENTION

The present invention relates to a guide system for guiding at least one movably-supported door wing, the guide system comprising:

at least one guide rail for guiding the at least one door wing, the at least one guide rail having a longitudinal direction, at least one running carriage configured to be connected to the at least one door wing and being configured to be displaceably supported along the at least one guide rail, a carrier on which the at least one running carriage can be arranged, wherein the carrier is configured to be movably supported in a direction extending transversely to the longitudinal direction of the at least one guide rail, wherein the carrier, in a mounted position, can be moved into a transfer position in which the carrier adjoins the at least one guide rail in the longitudinal direction, so that the running carriage can be transferred to and from between the at least one guide rail and the carrier, a locking device for releasably locking the carrier in the transfer position, so that a movement of the carrier in the direction extending transversely to the longitudinal direction can be prevented or restrained, wherein the locking device includes at least one movably-supported locking element for releasably locking between the at least one guide rail and the carrier, at least one control contour configured to be curved at least over a region, so that the running carriage, upon a transfer from the at least one guide rail to the carrier, can be moved at least over a region in the direction extending transversely to the longitudinal direction.

Moreover, the invention concerns an item of furniture comprising a guide system of the type to be described.

In the AT 519902 B1 reference, which is older in priority but published posterior, discloses a guide system for moving a door wing. The guide system includes a first guide rail and a second guide rail extending transversely to the first guide rail. By a guide carriage, the door wing can be displaced along the first guide rail, and the guide carriage, for a movement along the transversely extending second guide rail, can be transferred onto a carrier. In a transfer position, the carrier adjoins the first guide rail in a longitudinal direction of the first guide rail and is releasably locked with the first guide rail. By an entry of the guide carriage into the carrier, the locking between the first guide rail and the carrier can be released, so that the carrier is unblocked for a movement along the transversely extending second guide rail. In the transfer position, the carrier is locked with the first guide rail by a movably-supported locking lever. The locking lever can be moved into an unlocking position by an entry of the guide carriage into the carrier, so that the carrier can be unlocked from the first guide rail. The guide carriage includes at least one running wheel configured to run along a curved-shaped control contour of an adaptor portion. In this way, the door wing connected to the guide carriage can be guided in a direction towards the second guide rail, so that the movement of the door wing can be improved in a transition region between the first guide rail and the second guide rail. However, difficulties may arise when an actuation of the locking lever by the guide carriage and a movement of the running wheel of the guide carriage along the curved-shaped control contour are not precisely coordinated to one another. This may lead, for example, that the locking lever is released from the locking position either too soon or too late, and the running wheel of the guide carriage can get jammed with the curved-shaped control contour.

SUMMARY OF THE INVENTION

It is an object of the present invention to propose a guide system of the type mentioned in the introductory part, thereby avoiding the above-discussed drawbacks.

According to the invention, it is provided that the at least one movably-supported locking element includes at least one supporting element configured to be displaceable along the at least one control contour.

In other words, the locking element has a double function, because the locking element is configured for releasably locking between the carrier and the first guide rail on the one hand.

On the other hand, the locking element includes at least one supporting element (for example a gliding member or a rolling body) configured to be displaceable along the curved-shaped control contour in a transition region between the first guide rail and the second guide rail. In this way, locking and unlocking of the carrier in relation to the first guide rail and a movement of the supporting element along the control contour can be coordinated to one another in a timely improved manner, and the danger of a jamming of the supporting element with the curved-shaped control contour can be prevented.

For example, the at least one locking element can be movably supported on the carrier. Alternatively, it is possible that the locking element can be arranged on the first guide rail or on an adaptor portion connected to the first guide rail.

According to an embodiment, the at least one locking element is linearly displaceably supported. In this way, the locking element can be arranged in a space-saving manner, and oscillating movements of the locking element can be prevented. The direction of the linear displacement movement of the at least one locking element can thereby extend parallel to the longitudinal direction of the first guide rail, so that the locking element can be directly activated by a translatory movement of the running carriage.

According to a further embodiment, at least one force storage member can be provided, and the supporting element of the locking element is configured to be pressurized, at least over a region, against the control contour by a force of the force storage member. Due to the supporting element bearing against the control contour by a force of the force storage member, the unlocking between the carrier and the first guide rail, the course of a movement of the locking element in the transition region between the first and second guide rail, and the locking between the carrier and the first guide rail can be precisely controlled without delay.

The force storage member for pressurizing the supporting element against the control contour may include at least one helical spring. Alternatively, it is possible that the force storage member is formed by a material elasticity of a plastic portion.

According to a preferred embodiment, the at least one supporting element of the locking element can be configured so as to be rotationally symmetrical, preferably as a running wheel.

BRIEF DESCRIPTION OF THE DRAWINGS

Further details and advantages of the present invention result from the following description of figures.

DETAILED DESCRIPTION OF THE INVENTION

Figure 1A:
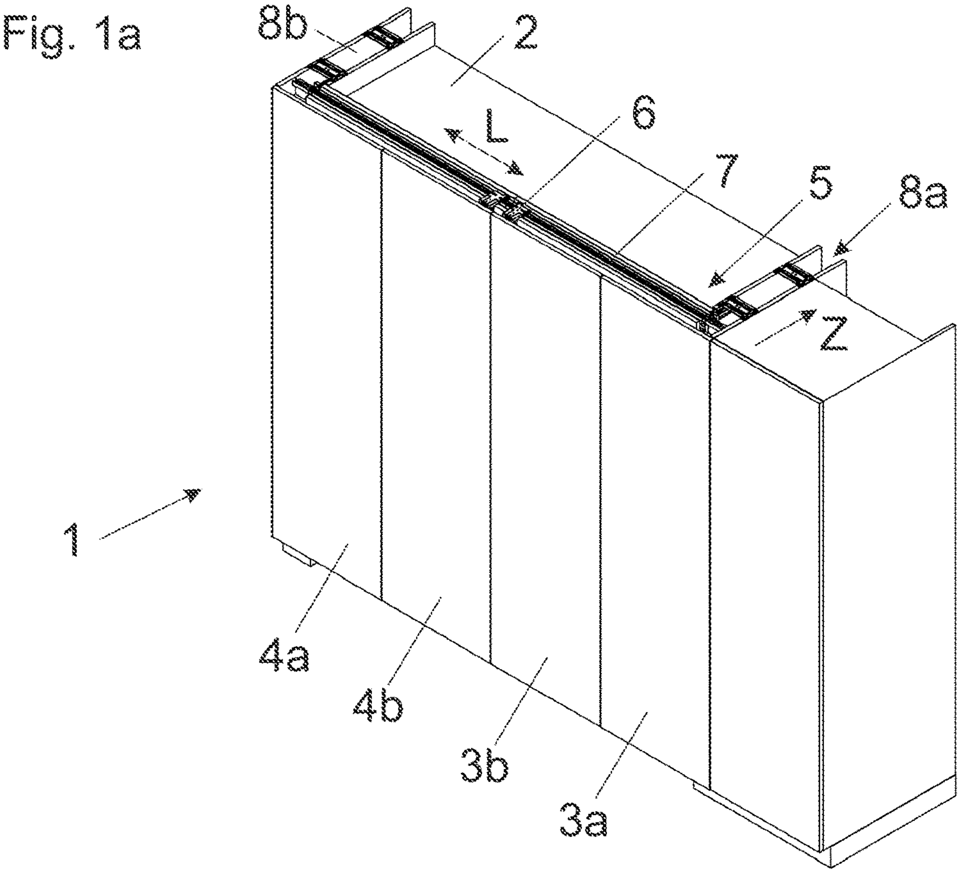
FIG. 1*a*, 1*b* are perspective views of an item of furniture comprising a furniture carcass and door wings movable relative thereto.

FIG. 1*a* shows a perspective view of an item of furniture 1 comprising a furniture carcass 2 and a folding-sliding-door having movable door wings 3*a*, 3*b*; 4*a*, 4*b*. The door wings 3*a*, 3*b* and the door wings 4*a*, 4*b* are each movably supported by a guide system 5 between a first position, in which the door wings 3*a*, 3*b*; 4*a*, 4*b* are aligned substantially coplanar to one another, and a second position, in which the door wings 3*a*, 3*b*; 4*a*, 4*b* are aligned substantially parallel to one another. The door wings 3*a*, 3*b* can be inserted into a lateral receiving compartment 8*a* of the furniture carcass 2 in a second (parallel) position, whereas the door wings 4*a*, 4*b* can be inserted into a further receiving compartment 8*b* when aligned in a parallel position to one another. The functionality will be explained in the following with the aid of the door wings 3*a*, 3*b*, and the same explanations apply to the door wings 4*a*, 4*b*. The guide system 5 includes a first guide rail 7 having a longitudinal direction (L), and a running carriage 6 configured to be coupled to the second door wing 3*b* is configured to run along the first guide rail 7. In a mounted position, the first guide rail 7 is arranged substantially horizontally and parallel to a front face of the furniture carcass 2.

Figure 1B:
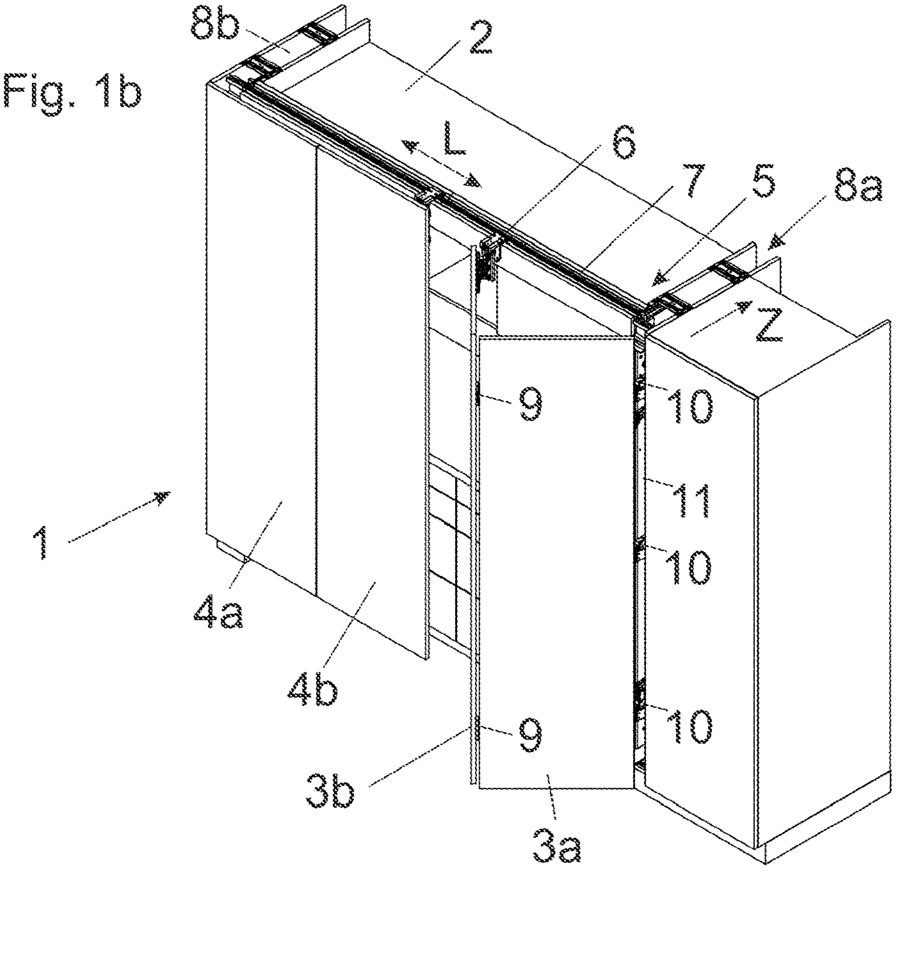

FIG. 1*b* shows the item of furniture 1, and the door wings 3*a*, 3*b* have been moved from the coplanar position shown in FIG. 1 a into an angled position relative to one another. For example, the first door wing 3*a* can be movably-supported on a carrier 11 by two or more furniture hinges 10, the carrier 11 being configured to be inserted into the receiving compartment 8*a* in a direction (Z). In the shown figure, the carrier 11 is located in a transfer position, so that the running carriage 6 can be transferred to and from between the first guide rail 7 and the carrier 11. In the shown transfer position, the carrier 11 is releasably locked in relation to the first guide rail 7, and the locking of the carrier 11 is configured to be released by an entry of the running carriage 6 in or onto the carrier 11. The carrier 11 is in the form of an elongated column, a length of which corresponding to at least half of a height of the door wings 3*a*, 3*b*. The two door wings 3*a*, 3*b* are hingedly connected to one another about a vertically extending axis in the mounted position by at least one hinge fitting 9. The second door wing 3*b* can be guided along the first guide rail 7 via the running carriage 6.

Figure 2A:
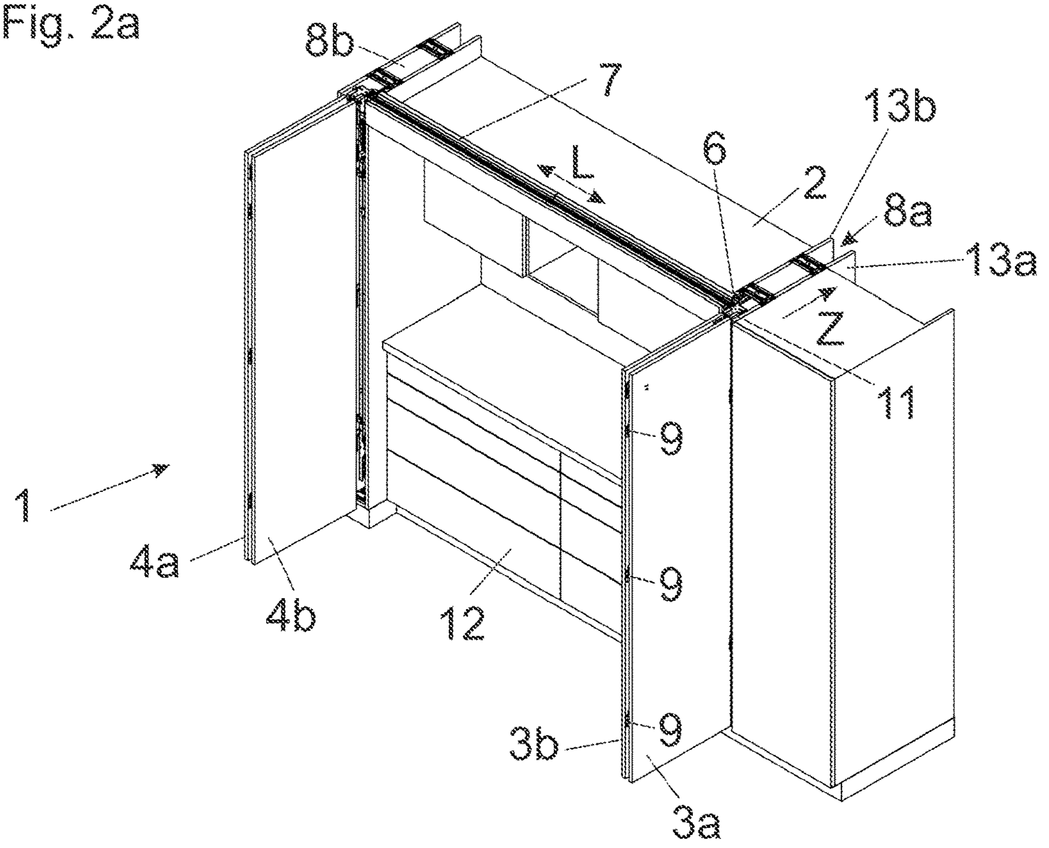
FIG. 2*a*, 2*b* show the item of furniture according to FIGS. 1*a*, 1*b* with the door wings in further positions to one another.

FIG. 2*a* shows the item of furniture 1 with the door wings 3*a*, 3*b* which are now aligned parallel to one another. The carrier 11 has been unlocked from the first guide rail 7 by an entry of the carrier 6, so that the carrier 11 (jointly with the running carriage 6 and the door wings 3*a*, 3*b*) can be inserted along a second guide rail 17 (FIG. 3*a*) of the guide system 5 into the receiving compartment 8*a*, the second guide rail 17 extending transversely to the longitudinal direction (L) of the first guide rail 7.

Figure 2B:
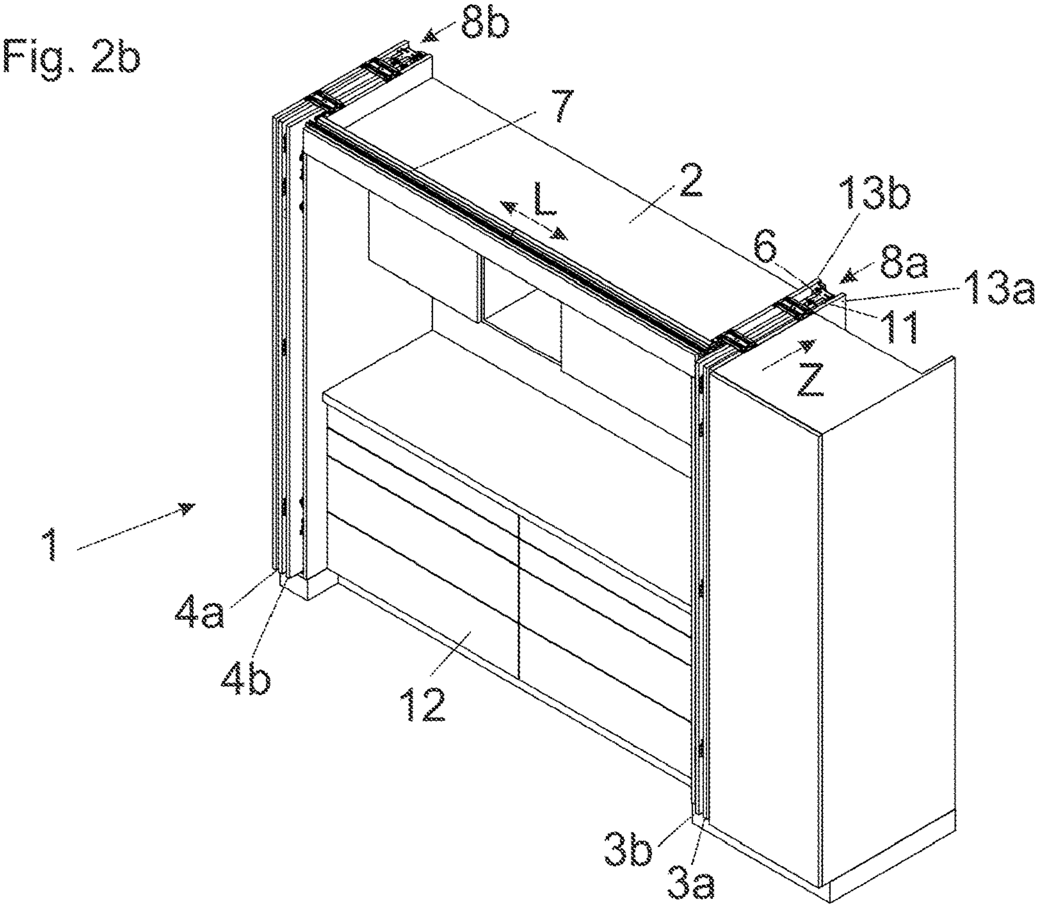

FIG. 2*b* shows the item of furniture 1 with the door wings 3*a*, 3*b* which are now located in a fully inserted condition within the receiving compartment 8*a*. The door wings 3*a*, 3*b* are thus movably supported by the guide system 5 between a first position according to FIG. 1*a*, in which the door wings 3*a*, 3*b* are aligned substantially coplanar to one another, and a second position according to FIG. 2*b*, in which the door wings 3*a*, 3*b* are aligned substantially parallel to one another and can be accommodated within the receiving compartment 8*a*. In this way, for example, a kitchen 12 as shown in FIG. 2*a*, 2*b* can be entirely covered, so that the kitchen 12 can be visually separated from a remaining area of a living room. In the shown embodiment, the receiving compartment 8*a* is formed by a sidewall 13*a* and by a stationary furniture part 13*b* spaced from the sidewall 13*a* in a parallel relationship. The door wings 3*a*, 3*b*, in a parallel position to one another, can be inserted between the sidewall 13*a* and the stationary furniture part 13*b*.

Figure 3:
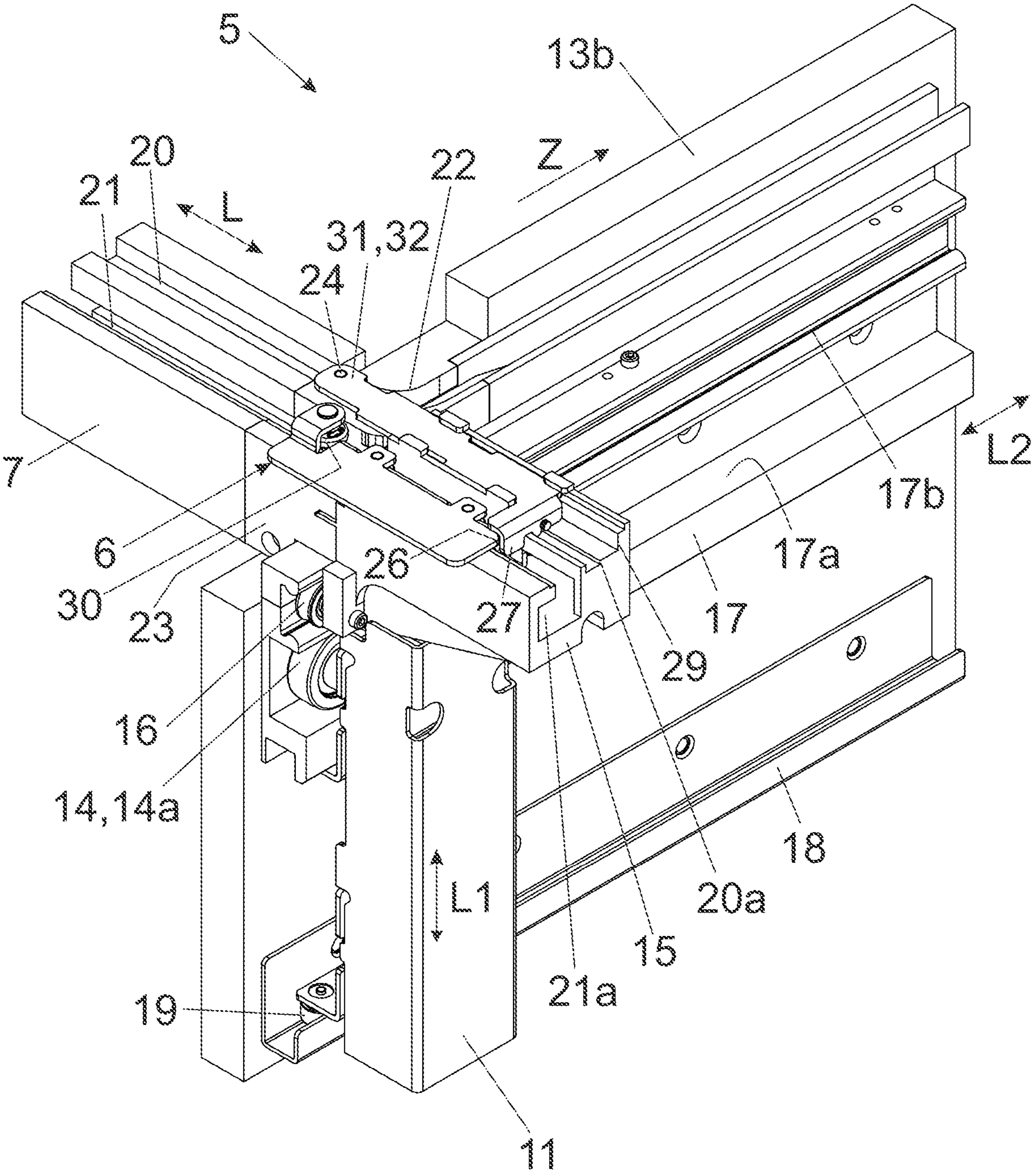
FIG. 3 shows the guide system in a perspective view.

FIG. 3 shows a perspective view of the guide system 5 in a region between the sidewall 13*a* and the stationary furniture part 13*b*, between which the receiving compartment 8*a* for receiving the door wings 3*a*, 3*b* is formed. The first guide rail 7 has a longitudinal direction (L) extending parallel to a front face of the furniture carcass 2 in a mounted position. The second guide rail 17 having a longitudinal direction (L2) is arranged on the stationary furniture part 13*b*, and the longitudinal direction (L) of the first guide rail 7 and the longitudinal direction (L2) of the second guide rail 17 extend transversely, preferably substantially at a right angle, to one another. The carrier 11 is configured for movably supporting the at least one door wing 3*a*, and the door wing 3*a*, in a mounted condition, is pivotally supported on the carrier 11 about a vertically extending axis by two or more furniture hinges 10 (FIG. 1*b*). The carrier 11 includes at least one guiding device 14 for moving the carrier 11 along the second guide rail 17 in the direction (Z) and in a direction opposite the direction (Z). In the shown figure, the guiding device 14 of the carrier 11 includes at least one running wheel 14*a* movably supported along a first running limb 17*a* of the second guide rail 17.

In the shown embodiment, the carrier 11 is configured to be releasably locked to the first guide rail 7 via a receiving device 15. The receiving device 15 is configured to receive the running carriage 6, so that the running carriage 6 can be moved from the first guide rail 7 into the receiving device 15. For this purpose, guide grooves 20, 21 may be provided in the first guide rail 7, the guide grooves 20, 21 extending in the longitudinal direction (L) of the first guide rail 7 and being aligned flush with corresponding guide grooves 20*a*, 21*a* of the receiving device 15 when the receiving device 15 is in the transfer position. In this way, the running wheels 30, 30*a* (FIG. 8) of the running carriage 6 can be displaced between the first guide rail 7 and the receiving device 15 without a disturbing abutting edge.

For an improved decoupling between the receiving device 15 and the carrier 11, it can be provided that the receiving device 15 includes at least one supporting roller 16 separate from the guiding device 14 of the carrier 11, the at least one supporting roller 16 being movably supported along the second guide rail 17. It is preferably provided that the second guide rail 17 includes a first running limb 17*a* and at least one second running limb 17*b* separate from the first running limb 17*a*. The running wheel 14*a* of the guiding device 14 is movably supported along the first running limb 17*a* of the second guide rail 17, and the at least one supporting roller 16 of the receiving device 15 is movably supported along the second running limb 17*b* of the second guide rail 17.

The carrier 11 and the receiving device 15, upon a movement along the second guide rail 17 in the direction (Z), are connected to one another in a movement-coupled manner. It is preferably provided that the receiving device 15 and the carrier 11, upon a movement along the second guide rail 17 in the direction (Z) and in a direction opposite the direction (Z), are coupled to one another without clearance. For an improved support of the carrier 11, a further guide rail 18 may be provided, and at least one further running wheel 19 of the carrier 11 is displaceably supported along the further guide rail 18.

Figure 8:
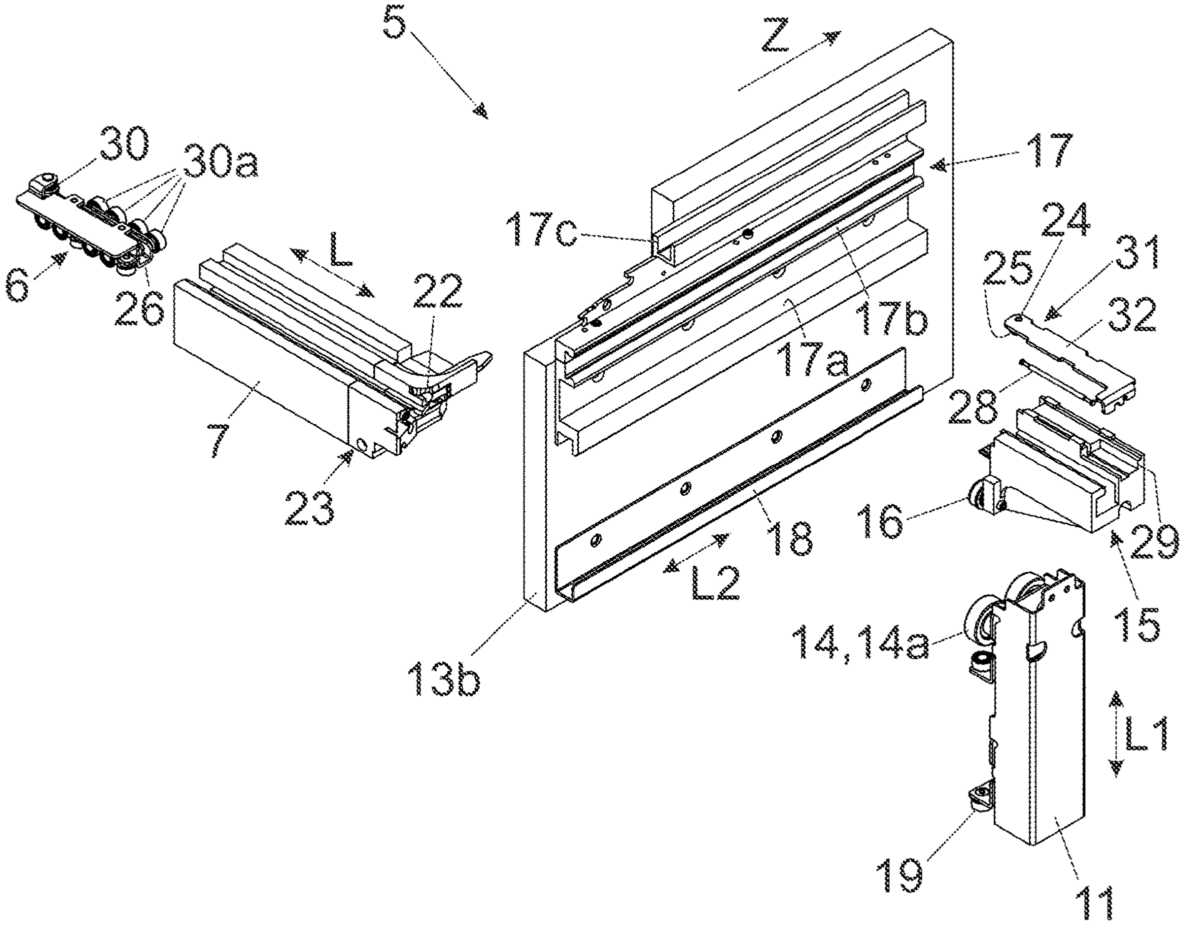
FIG. 8 shows the guide system in an exploded view.

In the transfer position shown in FIG. 3, the carrier 11 is releasably locked by a locking device 31, so that a movement of the carrier 11 in the direction (Z) extending transversely to the longitudinal direction (L) can be prevented or restrained. The locking device 31 includes at least one locking element 32 which is, for example, linearly displaceably supported on the carrier 11 in the longitudinal direction (L). A control contour 22 can be seen, the control contour 22 being configured to be curved-shaped at least over a region and being provided to move the running carriage 6 at least over a region in the direction (Z) extending transversely to the longitudinal direction (L) upon a transfer from the first guide rail 7 to the carrier 11. In the shown embodiment, the curved-shaped control contour 22 is arranged or formed on an adaptor portion 23, the adaptor portion 23 being arranged on an end region of the first guide rail 7. A supporting element 25 (not shown here, see FIG. 4) is pivotally supported on the locking element 32 about a pivoting axis 24. After the carrier 11 has been unlocked from the first guide rail 7, the supporting element 25 can be displaced along the control contour 22. The locking of the carrier 11, for unblocking a movement of the carrier 11 in the direction (Z), is configured to be released by an entry of the running carriage 6 in or onto the carrier 11. For this purpose, the running carriage 6 has an abutment 26 configured to cooperate with a counter-abutment 27 of the locking element 32, whereby the locking element 32 is moved away from the first guide rail 7 along a linear guide 29 of the carrier 11 against a force of a force storage member 28 (FIG. 8).

Figure 4:
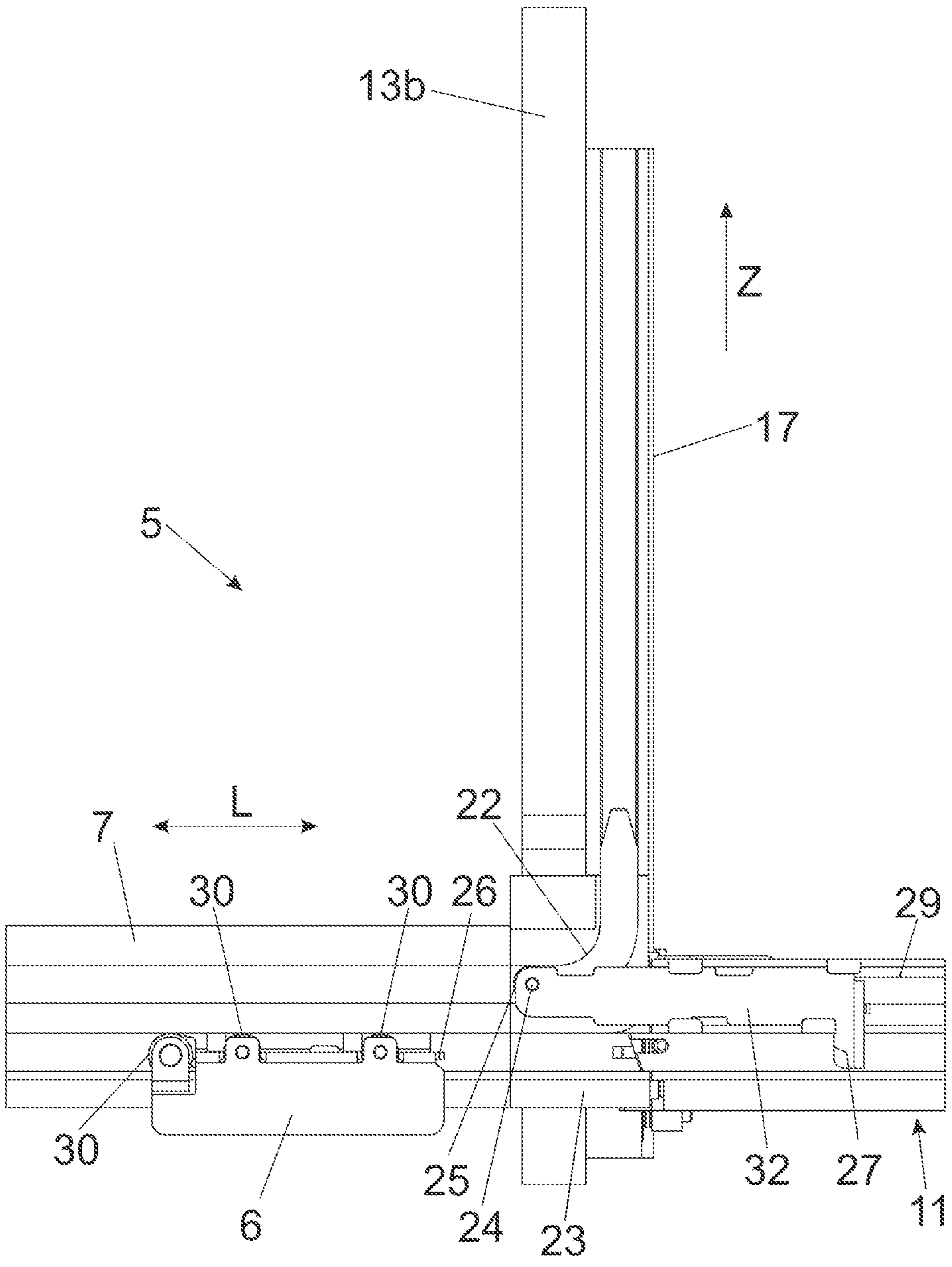
FIG. 4 shows the guide system in a top view with the running carriage in a first position.

FIG. 4 shows the guide system 5 in a top view, in which the first guide rail 7 and the second guide rail 17 extending at a right angle to the first guide rail 7 can be seen. The adaptor portion 23 adjoins an end portion of the first guide rail 7, the curved-shaped control contour 22 being arranged on the adaptor portion 23. The carrier 11, in the shown transfer position, is releasably locked by the linearly displaceable locking element 32, so that a movement of the carrier 11 in the direction (Z) can be prevented or restrained. The locking element 32 includes at least one supporting element 25 rotatably supported on the locking element 32 about a pivoting axis 24. Instead of a rotatable supporting element 25, a gliding member may also be provided, the gliding member being configured to be glidingly supported along the control contour 22. In the shown embodiment, the carrier 11 is locked, because the supporting element 25 loosely bears against a portion extending in the longitudinal direction (L) of the control contour 22, whereby a movement of the carrier 11 in the direction (Z) is restrained. The running carriage 6 hingedly connected to the furniture part 3*b* includes a plurality of running wheels 30, 30*a* configured to be displaceable along the first guide rail 7 in the longitudinal direction (L). The abutment 26 of the running carriage 6 and the counter-abutment 27 of the locking element 32 can be seen. In the shown figure, the abutment 26 and the counter-abutment 27 are spaced from one another.

Figure 5:
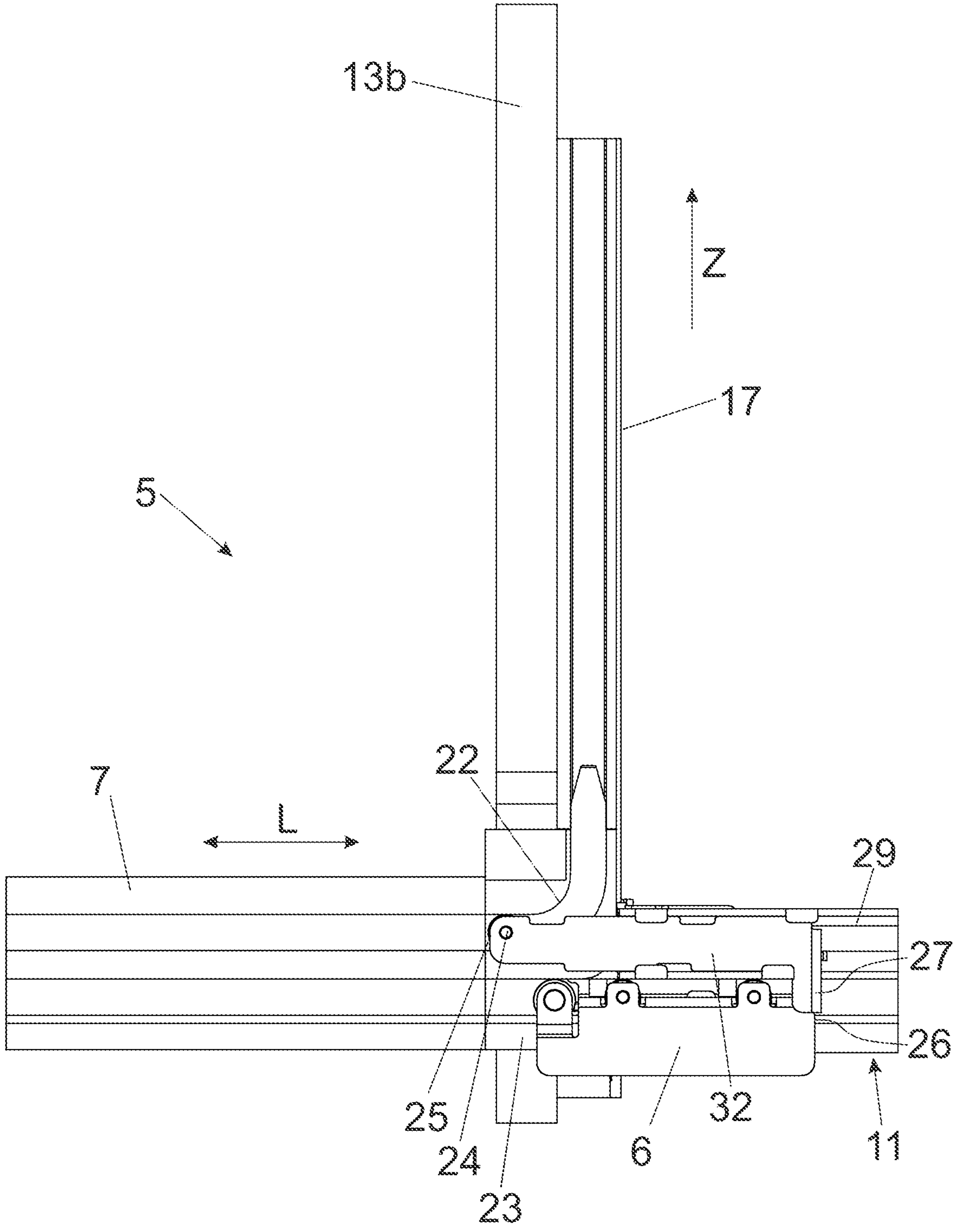
FIG. 5 shows the guide system according to FIG. 4 with the running carriage in a further position.

FIG. 5 shows the guide system 5 in a top view, in which the running carriage 6 is located in a further position. It is hereby visible that the abutment 26 of the running carriage 6 abuts against the counter-abutment 27 of the locking element 32. By the co-operation of the abutment 26 with the counter-abutment 27, the locking element 32 can be moved, against a force of the force storage member 28, in the longitudinal direction (L) along the linear guide 29 of the carrier 11 in a direction away from the first guide rail 7.

Figure 6:
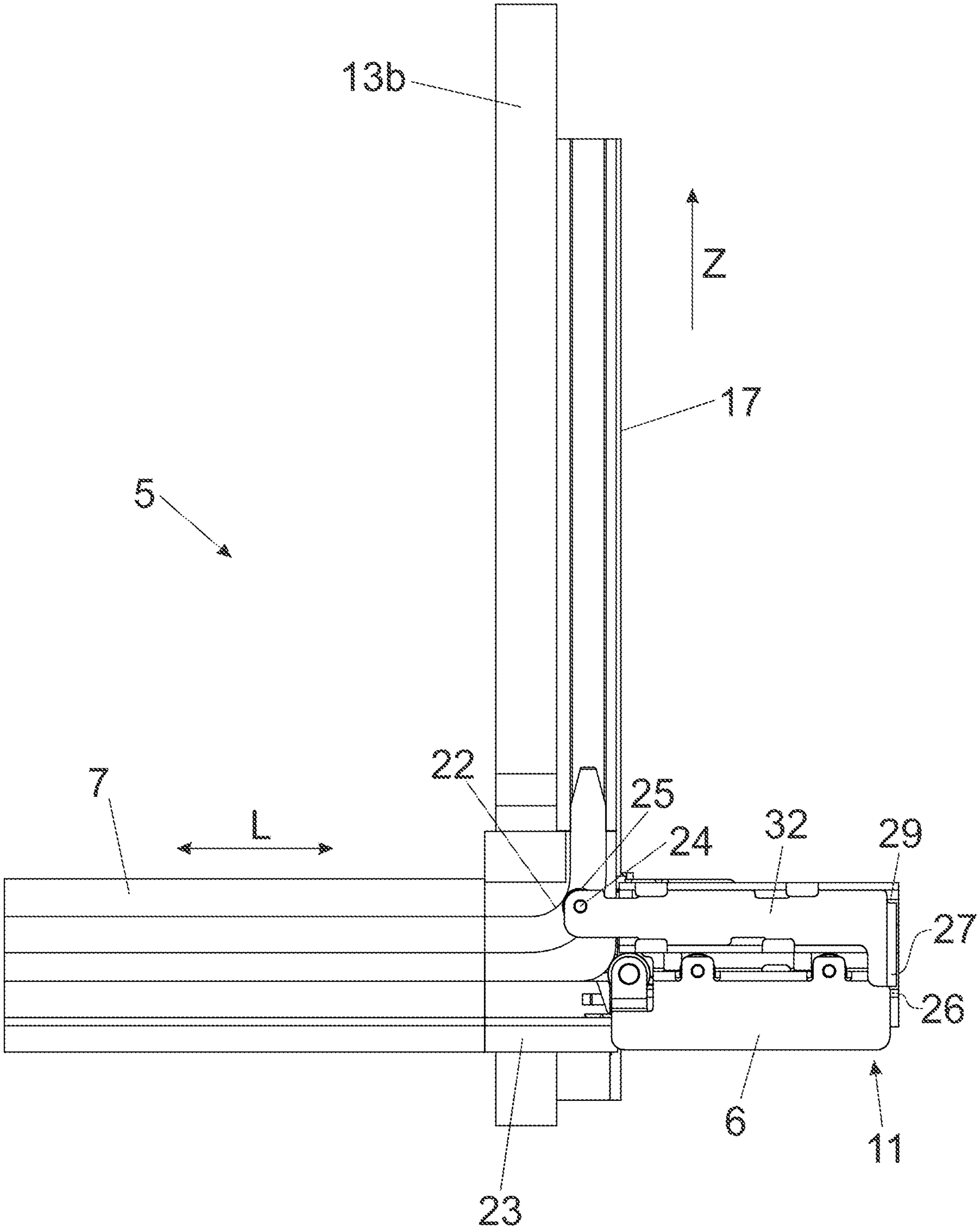
FIG. 6 shows the guide system with the running carriage in a further position.

FIG. 6 shows the guide system 5 in a top view, in which the running carriage 6 is located in a further position. The locking element 32, by the co-operation of the abutment 26 with the counter-abutment 27, can be displaced along the linear guide 29 of the carrier 11 against a force of the force storage member 28. The supporting element 25 in the form of a rolling body is rotated about the pivoting axis 24 and can be displaced along the curved-shaped control contour 22. As soon as the supporting element 25 has reached an apex of the control contour 22, the carrier 11 (jointly with the running carriage 6 arranged thereon) is unblocked for a movement in the direction (Z).

Figure 7:
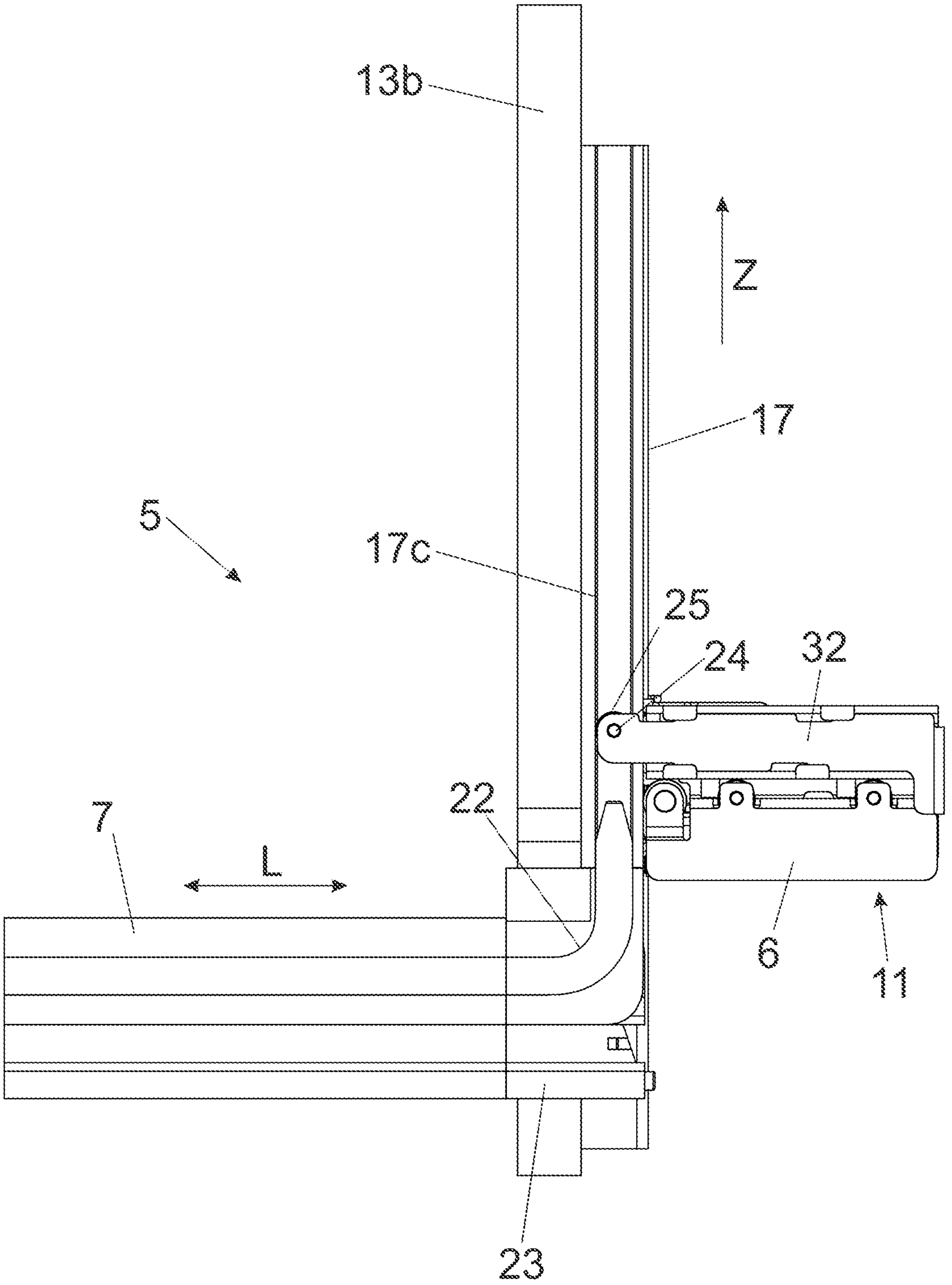
FIG. 7 shows the guide system with the running carriage in a further position.

FIG. 7 shows the guide system 5 in a top view, in which the running carriage 6 is located in a further position. The supporting element 25 has now passed the apex of the control contour 22, so that the carrier 11, jointly with the running carriage 6 (and with the two furniture parts 3*a*, 3*b*) can be moved in the direction (Z). The second guide rail 17 includes at least one further running limb 17*c* extending at least over a region in the direction (Z) and adjoining directly the at least one control contour 22. The supporting element 25 of the locking element 32, upon a movement of the carrier 11 in the direction (Z) extending transversely to the longitudinal direction (L), is displaceable along the further running limb 17*c* of the second guide rail 17. In this way, the supporting element 25 of the locking element 32 can be displaced between the control contour 22 of the adaptor portion 23 and the further running limb 17*c* of the second guide rail 17 without a disturbing abutting edge. From the position of the carrier 11 shown in FIG. 7, the two furniture parts 3*a*, 3*b* can be inserted into the retracted end position within the receiving compartment 8*a* (FIG. 2*a*, FIG. 2*b*).

FIG. 8 shows the guide system 5 in an exploded view. The first guide rail 7, which is only partially depicted, has a longitudinal direction (L) extending substantially at a right angle to the longitudinal direction (L2) of the second guide rail 17 in the mounted position of the guide system 5. The running carriage 6 configured to be connected to the door wing 3*b* is configured to be displaced along the first guide rail 7 and includes a plurality of running wheels 30, 30*a* having horizontally and vertically extending rotational axes in the mounted position. An adaptor portion 23 separate from the first guide rail 7 is arranged on an end of the first guide rail 7, and the curved-shaped control contour 22 is formed or arranged on the adaptor portion 23. The carrier 11, which is only partially depicted, is configured to be connected to the door wing 3*a* by two or more furniture hinges 10 (FIG. 1*b*). The carrier 11 includes a plurality of running wheels 14*a*, 19 spaced from one another in a height direction, and the running wheel 14*a* can be displaced on the first running limb 17*a* of the second guide rail 17 and the running wheel 19 can be displaced along the further guide rail 18. The carrier 11 further includes the receiving device 15 on which the running carriage 6 can be arranged. The receiving device 15 of the carrier 11 can be releasably locked by the locking device 31, so that a movement of the carrier 11 in the direction (Z) can be prevented when the carrier 11 is in the transfer position. The receiving device 15 further includes at least one supporting roller 16 configured to run along the second running limb 17*b* of the second guide rail 17. The locking element 32 is displaceably supported along a linear guide 29 in a direction extending parallel to the longitudinal direction (L) of the first guide rail 7, and the supporting element 25 is configured to run along the control contour 22. The supporting element 25 can be pressed, at least over a region, against the control contour 22 by a force of the force storage member 28. In the shown embodiment, the force storage member 28 includes at least one helical spring configured as a tension spring.

Figure 9A:
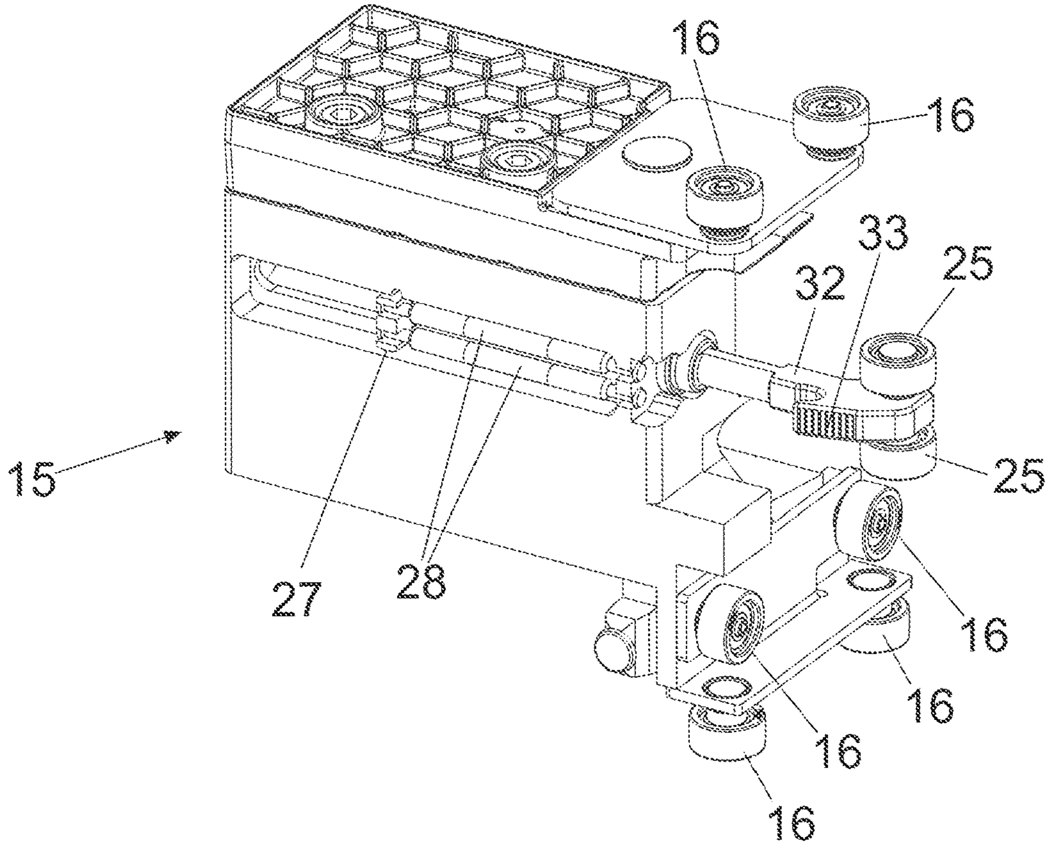
FIG. 9*a*, 9*b* are two different perspective views of the receiving device of the carrier according to an alternative embodiment.

FIG. 9*a* shows a perspective view of the receiving device 15 of the carrier 11 in an alternative embodiment. The general functionality of the receiving device 15 has already been described in connection with FIG. 3. The receiving device 15 includes a plurality of supporting rollers 16 having horizontal and vertical pivoting axes, and the supporting rollers 16 are displaceable along the second guide rail 17. The locking element 32 is linearly displaceably supported and can include two or more supporting elements 25 in the form of rollers configured to run along the curved-shaped control contour 22. Upon an entry of the running carriage 6, the abutment 26 of the running carriage 6 can contact the displaceable counter-abutment 27, and the locking element 32 is movable from the locking position shown in FIG. 8*a*, against a force of the two force storage members 28, for example in the form of tension springs, into a release position.

The at least one locking element 32 can be provided with a surface 33 for increasing the static friction, and by which the locking element 32, in the transfer position, can be held in a friction-locked manner. It can be preferably provided that a corrugation is arranged on the surface 33. In the transfer position, the surface 33 bears against a stationary counter-surface 37 (FIG. 14*b*). It is preferable that the counter-surface 37 is arranged on the at least one guide rail 7. It may also be provided that the counter-surface 37 is arranged on the adaptor portion 23.

Figure 9B:
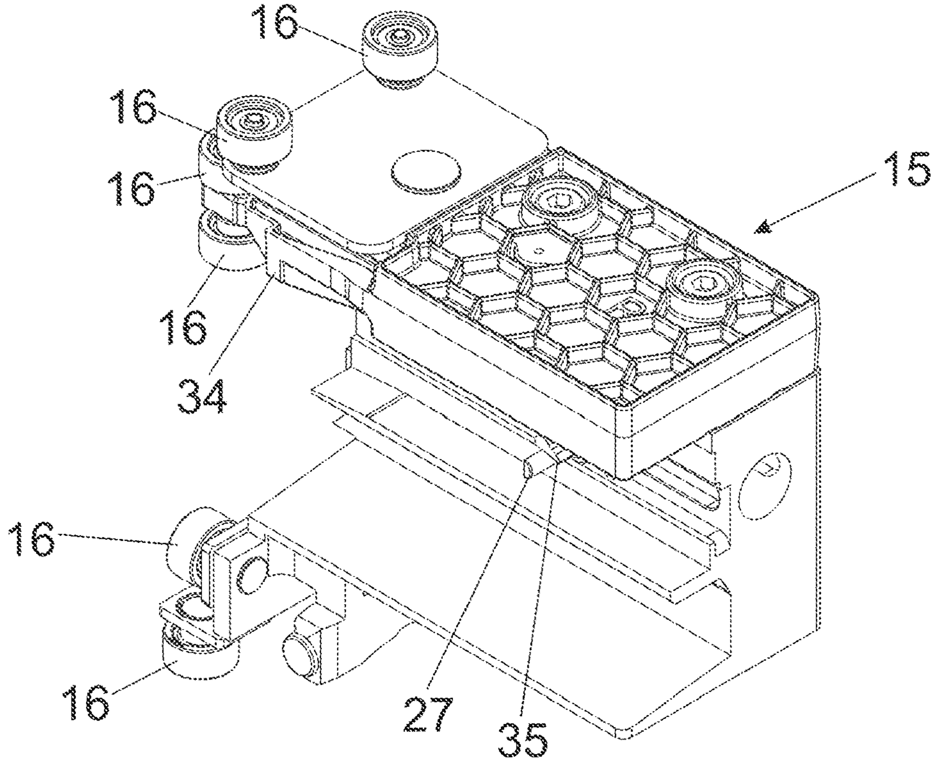

FIG. 9*b* shows the receiving device 15 of the carrier 11 according to FIG. 9*a* in a further perspective view. By a securing device 35, the at least one locking element 32 of the locking device 31, in the transfer position, can be secured relative to the carrier 11. By the securing device 35, it can be ensured that the transfer position can only be unlocked when the running carriage 6 duly enters the receiving device 15.

By at least one resilient abutment portion 34, the carrier 11 can be decelerated upon a movement into the transfer position. The resilient abutment portion 34 can be arranged on the carrier 11, on the receiving device 15, on the first guide rail 7 and/or on the adaptor portion 23.

Figure 10:
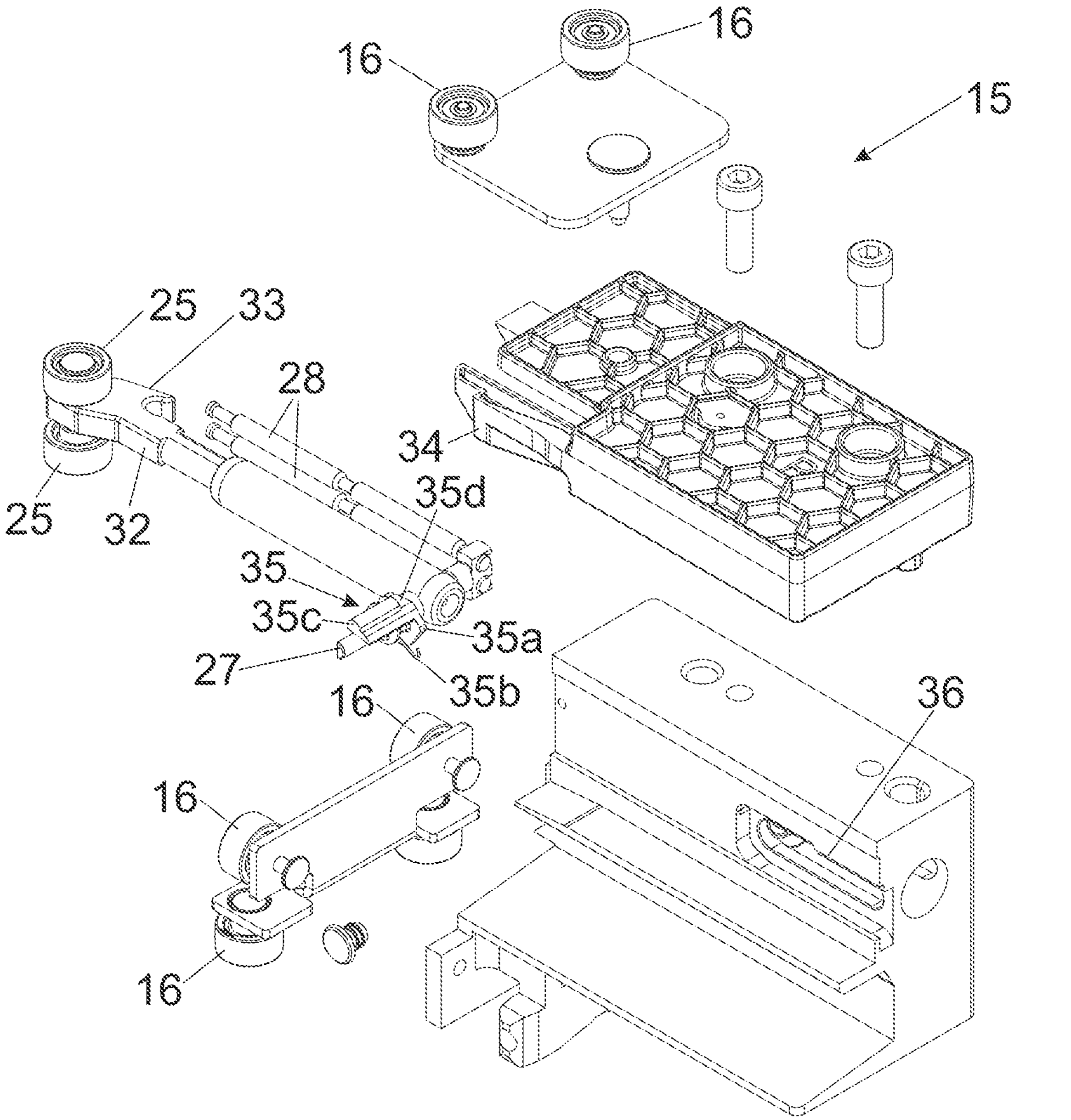
FIG. 10 shows the receiving device according to FIGS. 9*a*, 9*b* in an exploded view.

FIG. 10 shows an exploded view of the receiving device 15 of the carrier 11 according to FIGS. 9*a*, 9*b*. In the shown embodiment, the locking element 32 includes at least two supporting elements 25 which are spaced from one another in a height direction and which are configured to run along the curve-shaped control contour 22. By the securing device 35, the locking element 32 can be secured relative to the carrier 11 in the transfer position. The securing device 35 includes:

at least one pivotally mounted securing element 35*a*, wherein it is preferably provided that the securing element 35*a* is configured to be wedge-shaped at least over a region, and/or at least one spring element 35*b*, preferably in the form of a leg spring, the spring element 35*b* applying a force to at least one securing element 35*a* in a direction of a securing position, and/or at least one actuating element 35*c*, preferably bulge-shaped in a cross-section, for the at least one running carriage 6, the at least one securing device 35 being configured to be transferred from a securing position into a release position by the at least one actuating element 35*c*, and/or at least one gliding portion 35*d* configured to be displaced, in a release position of the at least one securing device 35, on a guide contour 36 arranged the carrier 11.

The securing element 35*a*, collectively with the actuating element 35*c* and the gliding portion 35*d*, can be formed as an integral one-piece component. When the spring element 35*b* is formed by a material elasticity of a plastic portion, the spring element 35*b* can also have, collectively with the aforementioned components, an integral one-piece configuration.

Figure 11A:
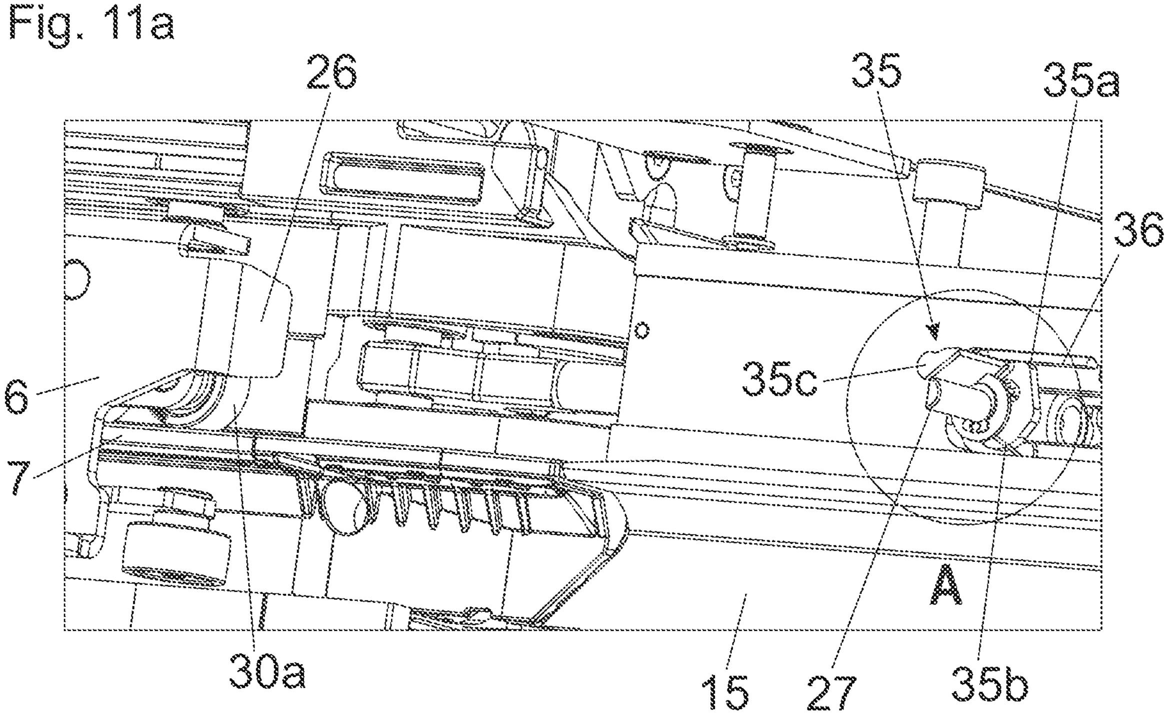
FIG. 11*a*, 11*b* show an entry of the running carriage into the receiving device of the carrier in a side view, and an enlarged detail view thereof.
Figure 11B:
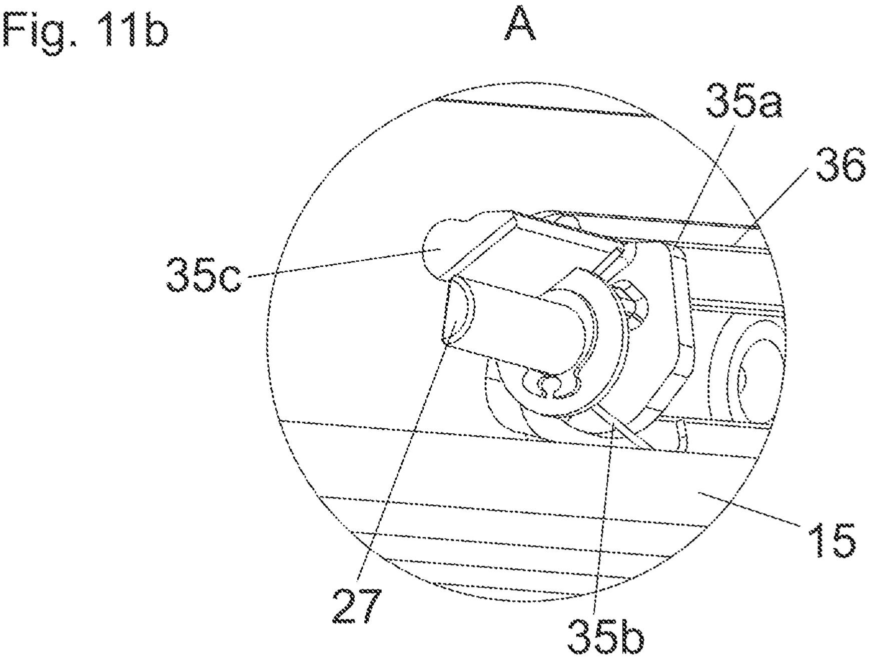

FIG. 11 a shows a side view of an entry movement of the running carriage 6 into the receiving device 15 of the carrier 11. It can be seen that the abutment 26 of the running carriage 6 is yet spaced from the counter-abutment 27 of the locking element 32, and the carrier 11 is locked relative to the first guide rail 7 in the transfer position. The actuating element 35*c* is pivotally supported on the counter-abutment 27 of the locking element 32. In the transfer position of the carrier 11, the wedge-shaped securing element 35*a* of the securing device 35 bears against the guide contour 36 by a force of the spring element 35*b*, and the locking element 32 is pressurized by a force in a direction of a securing position. FIG. 11*b* shows the encircled region “A” of FIG. 11*a* in an enlarged view.

Figure 12A:
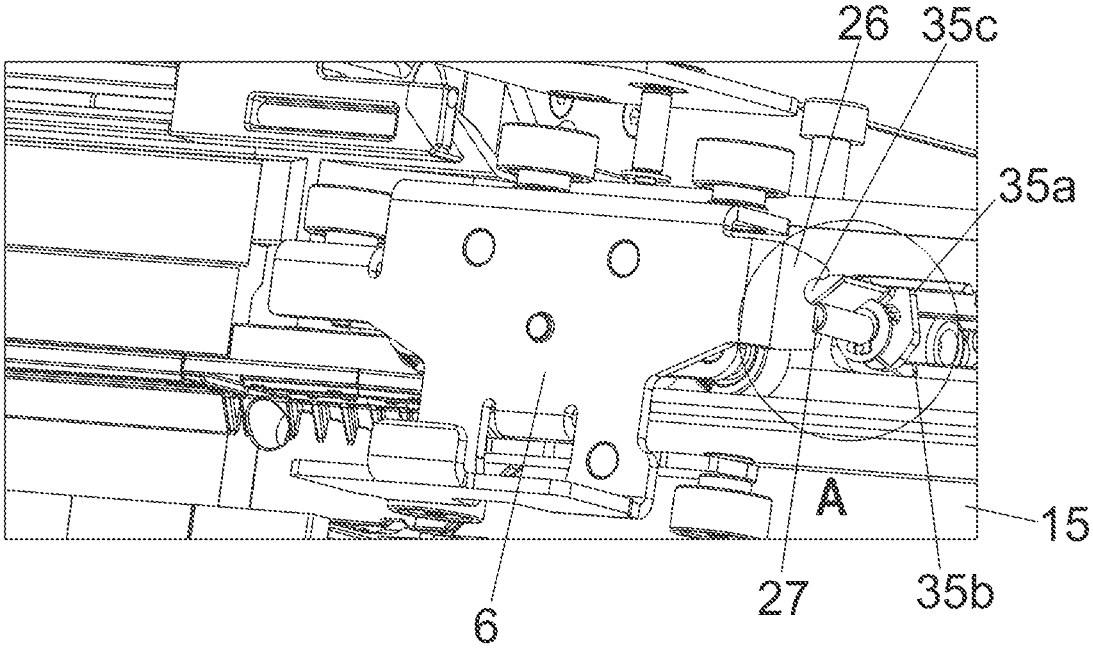
FIG. 12*a*, 12*b* show a continued entry movement of the running carriage into the receiving device of the carrier in a side view, and an enlarged detail view thereof.
Figure 12B:
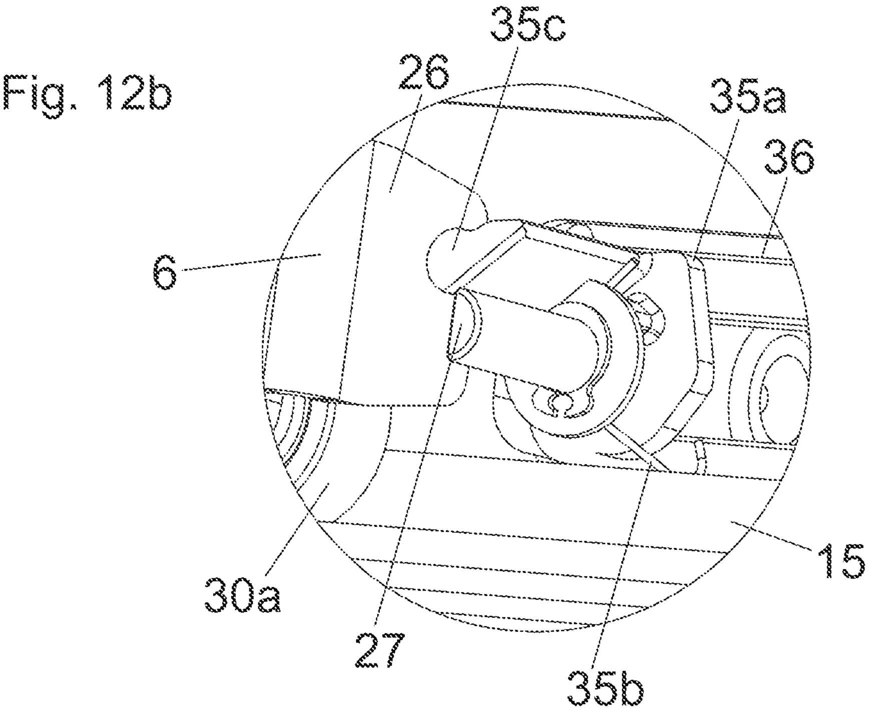

FIG. 12*a* shows a continued entry movement of the running carriage 6 into the receiving device 15 of the carrier 11. The abutment 26 of the running carriage 6 initially contacts the pivotally supported actuating element 35*c* of the securing device 35. In this way, the wedge-shaped securing element 35*a* can thereby be moved away from the guide contour 36 in a clockwise direction against a force of the spring element 35*b*. FIG. 12*b* shows the encircled region “A” of FIG. 12*a* in an enlarged view.

Figure 13A:
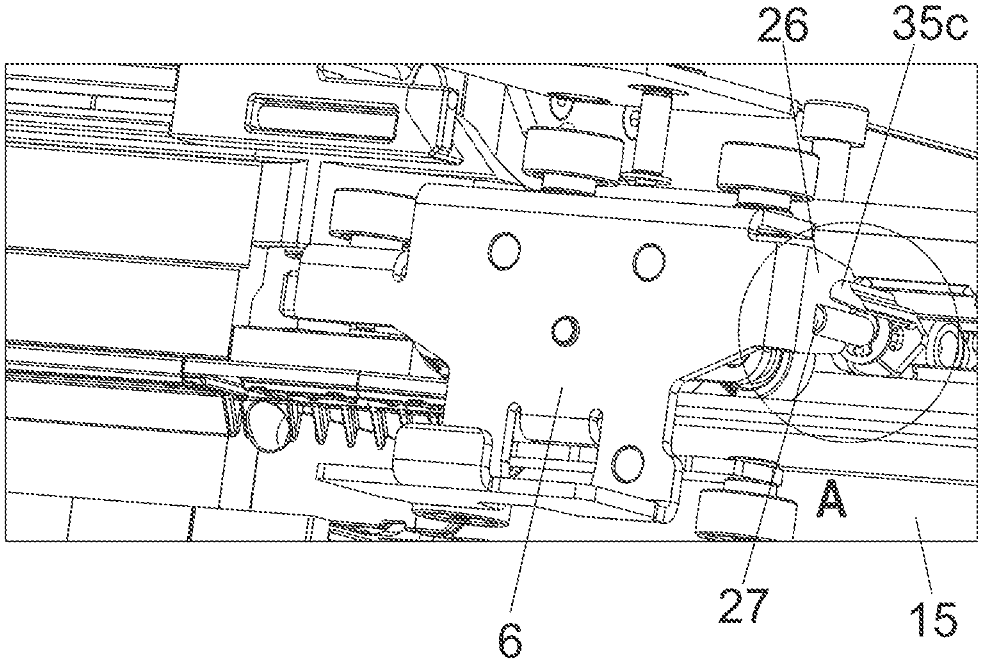
FIG. 13*a*, 13*b* show a continued entry movement of the running carriage into the receiving device of the carrier in a side view, and an enlarged detail view thereof.
Figure 13B:
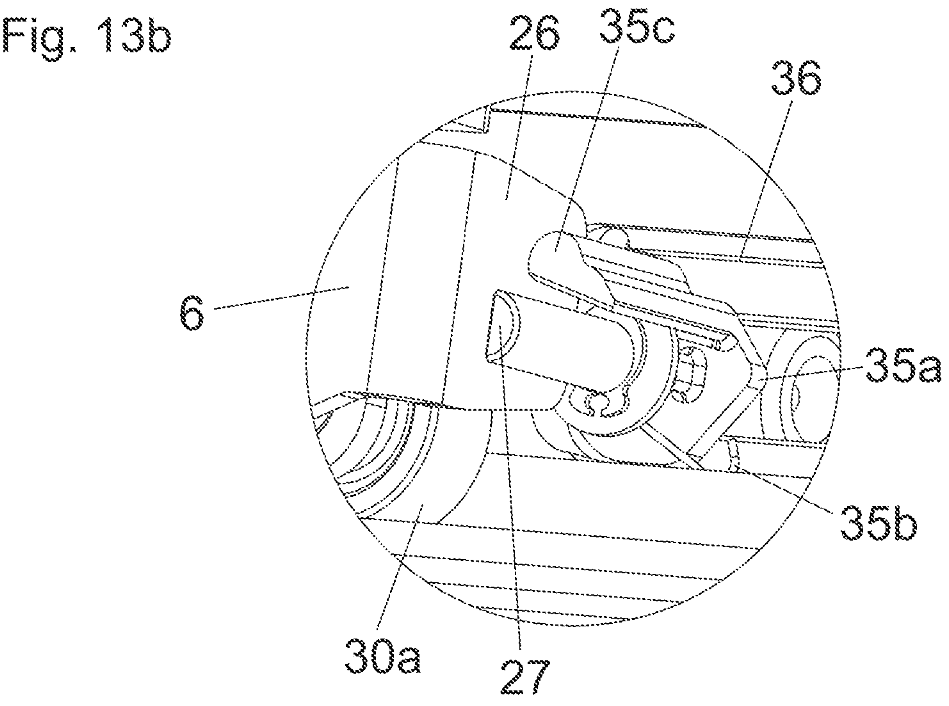

FIG. 13*a* shows a continued entry movement of the running carriage 6 into the receiving device 15 of the carrier 11. The abutment 26 of the running carriage 6, after the securing element 35*a* has been released from the securing position against a force of the spring element 35*b*, now abuts against the counter-abutment 27 of the locking element 32. By a continued movement of the running carriage 6, the locking element 32 and therewith the carrier 11 can be released from the transfer position. In the release position of the securing device 35, the gliding portion 35*d* shown in FIG. 10 can be displaced along the guide contour 36. FIG. 13*b* shows the encircled region "A" of FIG. 13*a* in an enlarged view.

Figure 14A:
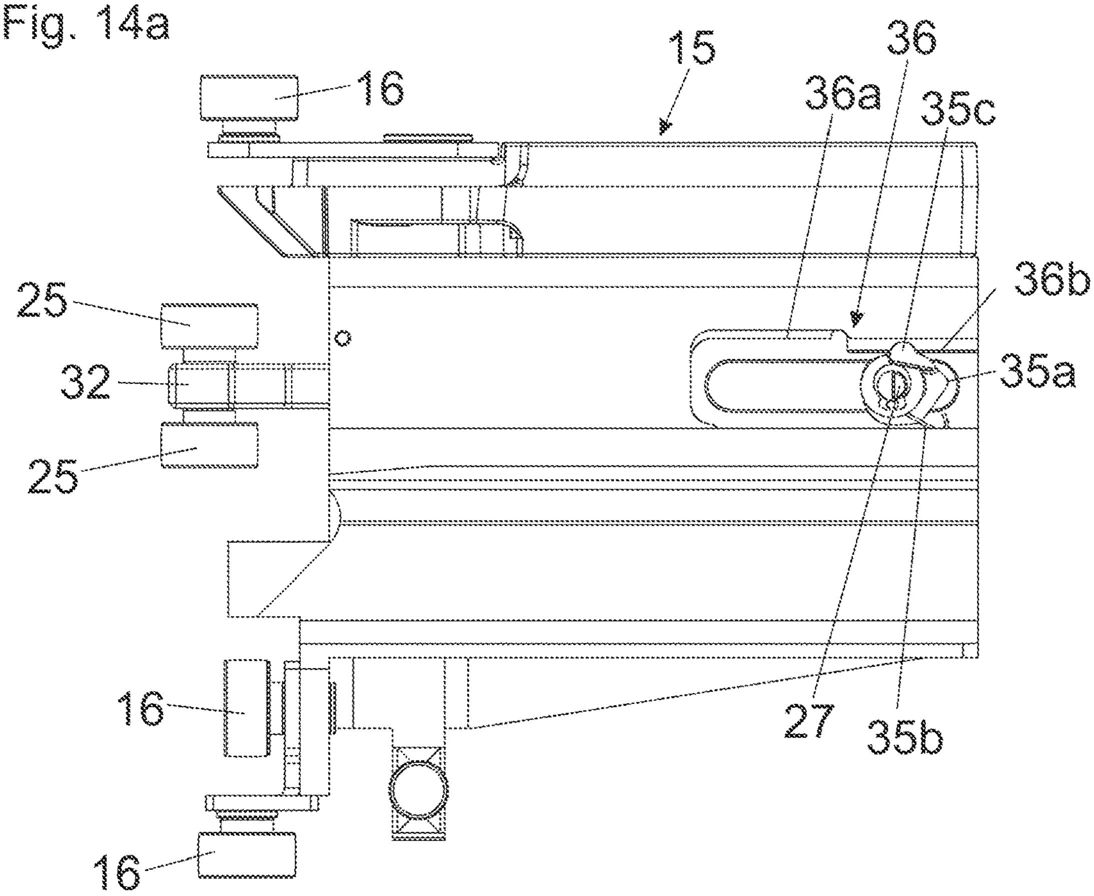
FIG. 14*a*, 14*b* are a side view of the receiving device, and a perspective cross-sectional view of the receiving device located in the transfer position.
Figure 14B:
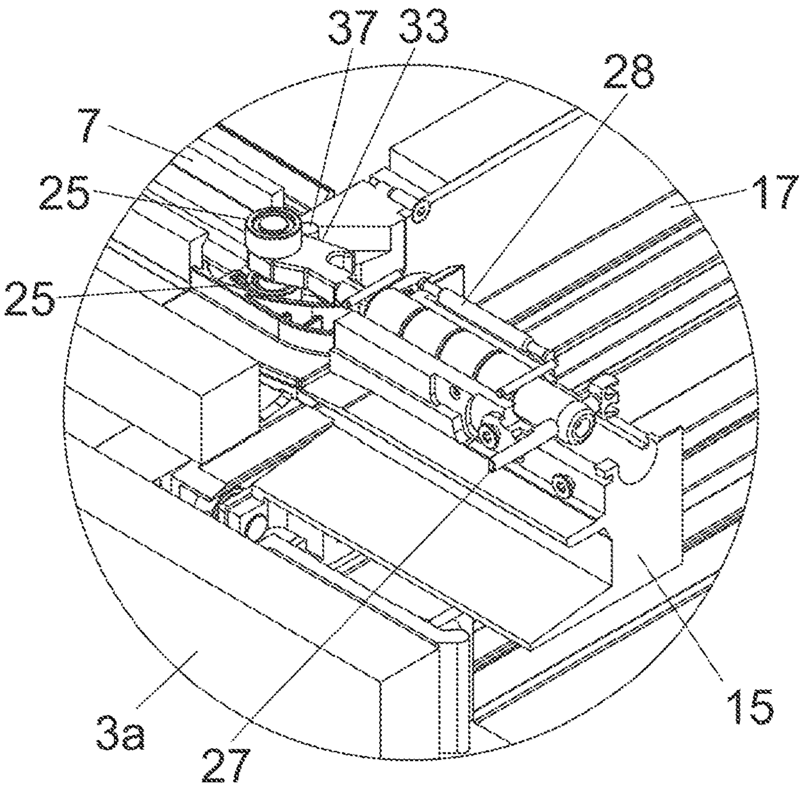

FIG. 14*a* shows the receiving device 15 of the carrier 11 in a side view. The guide contour 36 includes a locking section 36*a* and a release section 36*b* which are spaced from one another in a height direction, preferably via a step-shaped section. In the locking section 36*a*, the wedge-shaped securing element 35*a* can be locked with the guide contour 36. In the release section 36*b*, on the contrary, a locking between the securing element 35*a* and the guide contour 36 is not possible.

FIG. 14*b* shows a perspective cross-sectional view of the receiving device 15, which is in the transfer position, in relation to the first guide rail 7. It can be seen that the surface 33 for increasing the static friction of the locking element 32 (FIG. 9*a*) bears against a stationary counter-surface 37. It can be preferably provided that the counter-surface 37 is arranged on the at least one guide rail 7 or on the adaptor portion 23. In the shown embodiment, the counter-surface 37 is formed by a cylindrical pin.

The invention claimed is:

1. A guide system for guiding at least one movably-supported door wing, the guide system comprising:

a first guide rail for guiding the at least one door wing, the first guide rail having a longitudinal direction;

a running carriage configured to be connected to the at least one door wing and being configured to be displaceably supported along the first guide rail;

a carrier on which the running carriage can be arranged, wherein the carrier is configured to be movably supported in a direction extending transversely to the longitudinal direction of the first guide rail, wherein the carrier, in a mounted position, can be moved into a transfer position in which the carrier adjoins the first guide rail in the longitudinal direction, so that the running carriage can be transferred to and from between the first guide rail and the carrier;

a locking device for releasably locking the carrier in the transfer position, so that a movement of the carrier in the direction extending transversely to the longitudinal direction can be prevented or restrained, wherein the locking device includes a locking element which is movably-supported for releasably locking between the first guide rail and the carrier; and a control contour configured to be curved at least over a region, so that the running carriage, upon a transfer from the first guide rail to the carrier, can be moved at least over a region in the direction extending transversely to the longitudinal direction, wherein the locking element includes a supporting element configured to be displaceable along the control contour while being in direct contact with the control contour.

2. The guide system according to claim 1, wherein the locking element is movably supported on the carrier.

3. The guide system according to claim 1, wherein the locking element is linearly displaceably supported.

4. The guide system according to claim 3, wherein at least one linear guide is provided for displaceably supporting the locking element.

5. The guide system according to claim 1, further comprising a force storage member, wherein the supporting element of the locking element is configured to be pressed, at least over a region, against the control contour by a force of the force storage member.

6. The guide system according to claim 5, wherein the force storage member includes at least one helical spring.

7. The guide system according to claim 1, wherein the supporting element of the locking element is configured so as to be rotationally symmetrical.

8. The guide system according to claim 7, wherein the supporting element of the locking element is a running wheel.

9. The guide system according to claim 1, wherein the locking between the first guide rail and the carrier is configured to be released by an entry of the running carriage in or on the carrier.

10. The guide system according to claim 1, wherein the running carriage includes an abutment and the locking element includes a counter-abutment, and wherein the locking between the first guide rail and the carrier is configured to be released by a co-operation of the abutment with the counter-abutment.

11. The guide system according to claim 1, further comprising a second guide rail extending in the direction transversely to the longitudinal direction in a mounted position, wherein the carrier, upon a movement in the direction extending transversely to the longitudinal direction, is configured to be moved along the second guide rail.

12. The guide system according to claim 11, wherein the carrier includes at least one running wheel or at least one supporting roller configured to be displaceable along the second guide rail.

13. The guide system according to claim 11, wherein the second guide rail includes a running limb adjoining the control contour, wherein the supporting element of the locking element, upon a movement of the carrier in the direction extending transversely to the longitudinal direction, is displaceable along the running limb of the second guide rail.

14. The guide system according to claim 1, wherein the control contour is formed or arranged on an end section of the first guide rail.

15. The guide system according to claim 14, wherein the control contour, collectively with the first guide rail, has an integral one-piece configuration, or the control contour is arranged on an adaptor portion separate from the first guide rail.

16. The guide system according to claim 1, further comprising a securing device, the securing device being configured to secure the locking element of the locking device relative to the carrier in the transfer position.

17. The guide system according to claim 16, wherein the securing device includes a pivotally mounted securing element, or includes a spring element for pressurizing the securing element with a force in a direction of a securing position, or includes an actuating element for the running carriage, wherein the securing device is configured to be transferred by the actuating element from a securing position into a release position, or includes a gliding portion which, in a release position of the securing device, is displaceable along a guide contour arranged on the carrier.

18. The guide system according to claim 17, wherein the securing device includes the pivotally mounted securing element, and the securing element is configured to be wedge-shaped at least over a region, or includes the spring element in the form of a leg spring, or includes the actuating element, and the actuating element is bulge-shaped in a cross-section.

19. The guide system according to claim 1, wherein the locking element has a surface for increasing static friction, and in the transfer position, the surface for increasing static friction bears against a stationary counter-surface.

20. The guide system according to claim 19, wherein a corrugation is arranged on the surface for increasing static friction, and the stationary counter-surface is arranged on the first guide rail.

21. The guide system according to claim 1, wherein at least one resilient abutment portion is provided for decelerating the carrier upon a movement into the transfer position.

22. An item of furniture comprising:

a furniture carcass;

a first door wing movable relative to the furniture carcass; and the guide system according to claim 1 for moving the first door wing relative to the furniture carcass.

23. The item of furniture according to claim 22, further comprising a second door wing hingedly connected to the first door wing, wherein the first door wing and the second door wing are movably supported between a first position, in which the first door wing and the second door wing are aligned substantially coplanar to one another, and a second position, in which the first door wing and the second door wing are aligned substantially parallel to one another.

* * * * *